(12) United States Patent
Burnett

(10) Patent No.: US 9,011,780 B1
(45) Date of Patent: Apr. 21, 2015

(54) PHOTOCATALYTIC DEVICE FOR DUCTLESS HEATING AND AIR CONDITIONING SYSTEMS

(75) Inventor: Gregg William Burnett, Royse City, TX (US)

(73) Assignee: Dust Free, LP, Royse City, TX (US)

( * ) Notice: Subject to any disclaimer, the term of this patent is extended or adjusted under 35 U.S.C. 154(b) by 108 days.

(21) Appl. No.: 13/483,896

(22) Filed: May 30, 2012

(51) Int. Cl.
*A61L 2/10* (2006.01)
*B01D 53/94* (2006.01)

(52) U.S. Cl.
CPC .................................. *B01D 53/94* (2013.01)

(58) Field of Classification Search
USPC .................... 422/121, 24, 186.3; 96/224, 226
See application file for complete search history.

(56) References Cited

U.S. PATENT DOCUMENTS

| | | | |
|---|---|---|---|
| 2,881,854 A * | 4/1959 | Uehre, Jr. ...................... 96/138 |
| 4,859,329 A | 8/1989 | Fink |
| 5,011,609 A | 4/1991 | Fink |
| 5,120,435 A | 6/1992 | Fink |
| 5,236,585 A | 8/1993 | Fink |
| 5,919,422 A | 7/1999 | Yamanaka et al. |
| 6,221,314 B1 * | 4/2001 | Bigelow ......................... 422/24 |
| 6,546,883 B1 | 4/2003 | Fink et al. |
| 6,752,970 B2 | 6/2004 | Schwartz et al. |
| 6,784,440 B2 | 8/2004 | Fink et al. |
| 6,849,107 B1 * | 2/2005 | Huffman ......................... 96/224 |
| 6,949,228 B2 | 9/2005 | Ou Yang et al. |
| 6,997,185 B2 | 2/2006 | Han et al. |
| 7,160,566 B2 | 1/2007 | Fink et al. |
| 7,635,659 B2 | 12/2009 | Naganuma et al. |
| 7,871,518 B2 | 1/2011 | Ellis et al. |
| 7,988,923 B2 | 8/2011 | Fink et al. |
| 2003/0077211 A1 | 4/2003 | Schwartz et al. |
| 2003/0150708 A1 | 8/2003 | Fink |
| 2003/0230477 A1 | 12/2003 | Fink et al. |
| 2004/0016887 A1 | 1/2004 | Fink et al. |
| 2004/0056201 A1 | 3/2004 | Fink et al. |
| 2004/0156959 A1 | 8/2004 | Fink et al. |
| 2004/0197243 A1 | 10/2004 | Schwartz et al. |
| 2005/0163653 A1 * | 7/2005 | Crawford et al. ............... 422/24 |
| 2005/0186124 A1 | 8/2005 | Fink et al. |
| 2005/0238551 A1 * | 10/2005 | Snyder et al. .............. 422/186.3 |
| 2006/0144690 A1 | 7/2006 | Fink et al. |
| 2006/0163135 A1 * | 7/2006 | Ellis et al. ...................... 210/251 |
| 2006/0228275 A1 | 10/2006 | Rutman et al. |
| 2006/0266221 A1 | 11/2006 | Fink et al. |
| 2007/0000407 A1 * | 1/2007 | Leong ......................... 106/15.05 |
| 2007/0110860 A1 | 5/2007 | Fink et al. |
| 2009/0041617 A1 * | 2/2009 | Lee .................................... 422/4 |

(Continued)

FOREIGN PATENT DOCUMENTS

| | | |
|---|---|---|
| CN | 2392106 Y | 8/2000 |
| CN | 2922905 Y | 7/2007 |
| CN | 101245939 A | 8/2008 |

(Continued)

*Primary Examiner* — Sean E Conley
*Assistant Examiner* — Donald Spamer
(74) *Attorney, Agent, or Firm* — Fogarty, L.L.C.

(57) ABSTRACT

A photocatalytic device comprising an ultraviolet light source and a plurality of multi-metallic photocatalytic structures, such as hydrated quad-metallic catalyst surfaces, is mounted on a mini-split system. The photocatalytic device has curved reflectors that are positioned to reflect ultraviolet light against a face of the photocatalytic structures. The photocatalytic device has an exhaust deflection shield that directs airflow toward an intake of the mini-split or PTAC system.

21 Claims, 4 Drawing Sheets

(56) References Cited

U.S. PATENT DOCUMENTS

2009/0183943 A1 7/2009 Leistner et al.
2009/0217690 A1 9/2009 Silderhuis
2011/0250125 A1 10/2011 Fink et al.

FOREIGN PATENT DOCUMENTS

| CN | 201135626 Y | 10/2008 |
| DE | 20211178 U1 | 11/2002 |
| WO | WO 2006/134149 A1 | 12/2006 |

* cited by examiner

PHOTOCATALYTIC DEVICE FOR DUCTLESS HEATING AND AIR CONDITIONING SYSTEMS

TECHNICAL FIELD

Embodiments of the invention are directed, in general, to oxidation technology for air purification systems and, more specifically, to a photocatalytic device that is adapted to be used with ductless heading and air conditioning systems.

BACKGROUND

Air-source heat pumps transfer heat between a building and the outside air. Heat pumps are popular because of their low cost and capability to do an excellent job of heating, cooling and dehumidifying. For homes without ducts, air-source heat pumps are available in a ductless version called a ductless mini-split heat pump that has two parts—an indoor unit and an outdoor unit. The mini-split products are typically super-efficient, energy star rated, and reliable. Both the indoor and outdoor units are basically silent. A mini-split heat pump provides a cost-effective, environmentally friendly, heating and cooling system.

A typical mini-split system is used to maintain indoor air quality. However, the primary function of most heating and air conditioning systems is to control the temperature and humidity of the air. Many indoor air pollutants, such as volatile organic compounds (VOCs), cannot be removed by typical mini-split systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Often, an air cleaning device may be added to ducts in a heating and air conditioning systems to remove VOCs. Photocatalytic air cleaning devices are a common technique for indoor air purification and deodorization. A photocatalytic air cleaning device in a HVAC system is typically a duct-mounted device that comprises an ultraviolet lamp illuminating a photocatalytic filter to create free radicals that eliminate VOCs. Mini-split systems do not have ducts and, therefore, cannot use existing photocatalytic air cleaning devices.

In one embodiment, a photocatalytic device is adapted to be externally mounted on a mini-split system. The photocatalytic device may be mounted in any location that allows air flow to or from the mini-split to pass through the device. For example, the photocatalytic device may be mounted at an intake or supply vent or at an exhaust or return vent of a mini-split system.

In embodiments, the photocatalytic device comprises an ultraviolet light source and one or more catalyst substrates that are adapted to support a hydroxyl radical reaction with water vapor that results in hydro peroxides and hydroxyl ions. Such a photocatalytic device may be positioned at the intake of a mini-split system to clean the air space serviced by the heating and cooling system.

In other embodiments, the photocatalytic device may be adapted to be retrofitted to existing or installed mini-split systems.

BRIEF DESCRIPTION OF THE DRAWINGS

Figure 1:
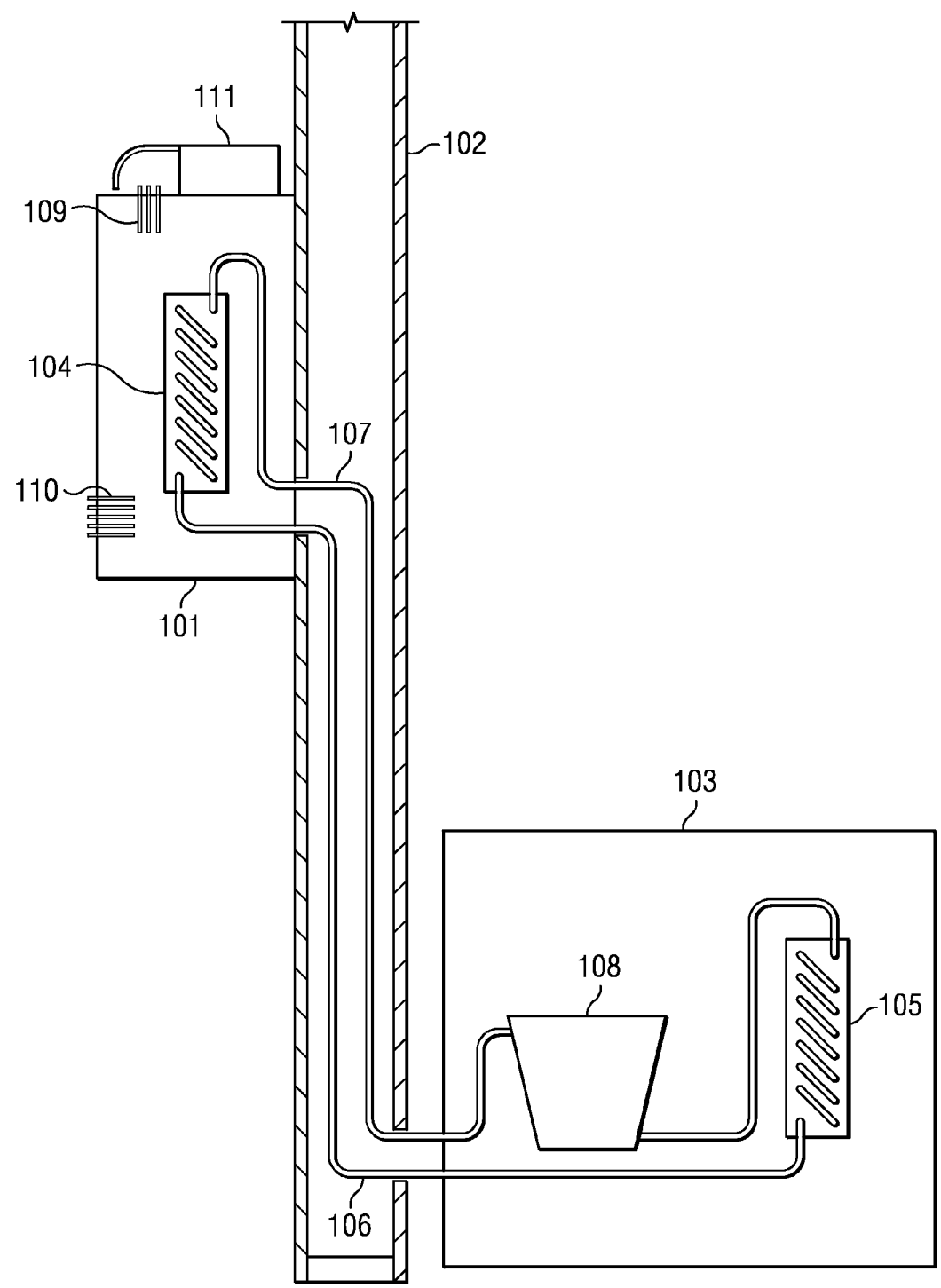

Having thus described the invention in general terms, reference will now be made to the accompanying drawings, which are not necessarily drawn to scale, and wherein:

FIG. 1 is a block diagram illustrating a mini-split heating and cooling system.

Figures 2, 3:
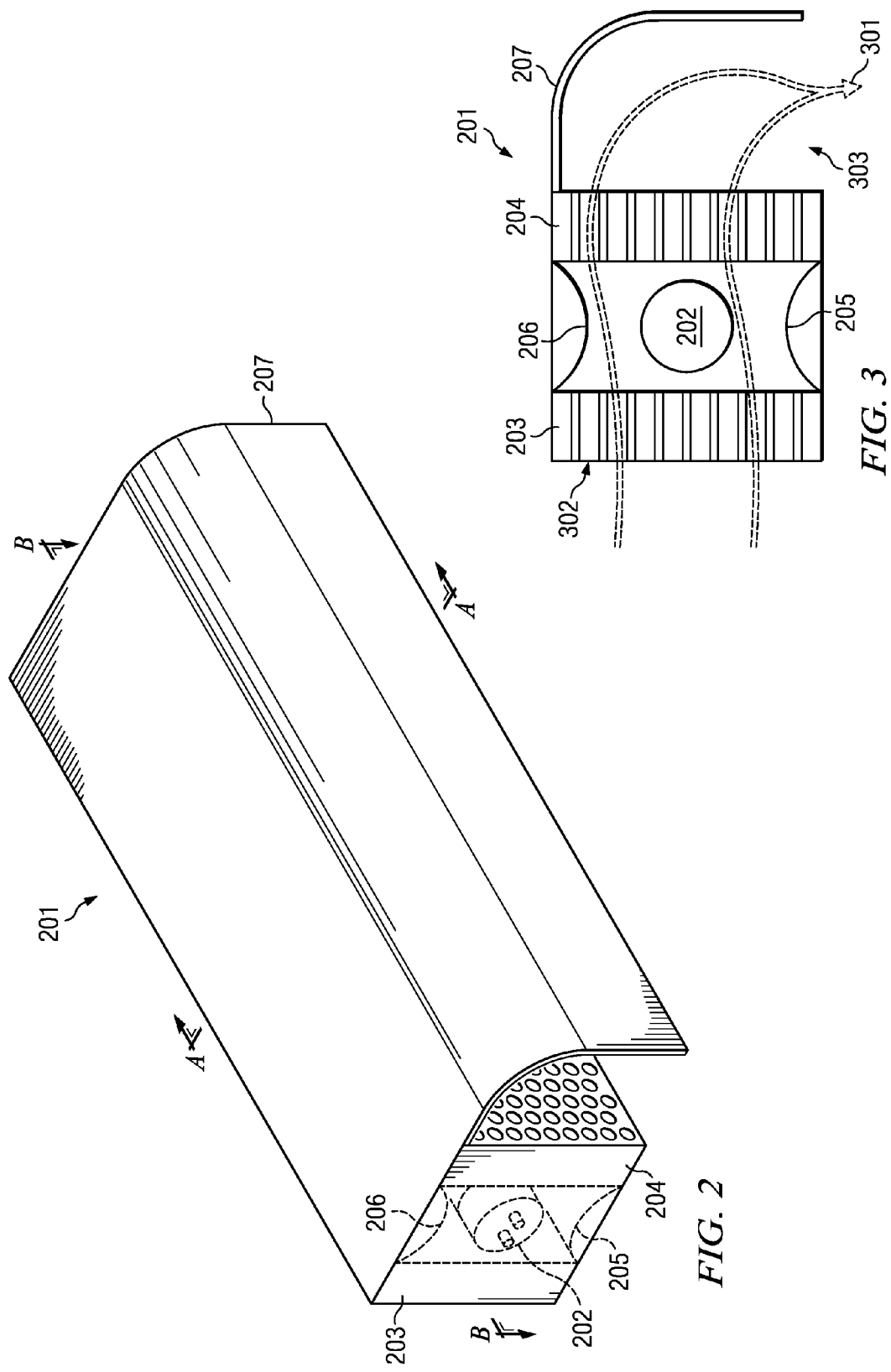

FIG. 2 is a block diagram of a photocatalytic device adapted for use with a mini-split system according to one embodiment.

FIG. 3 is a cross section view of the photocatalytic device according to one embodiment.

Figure 4:
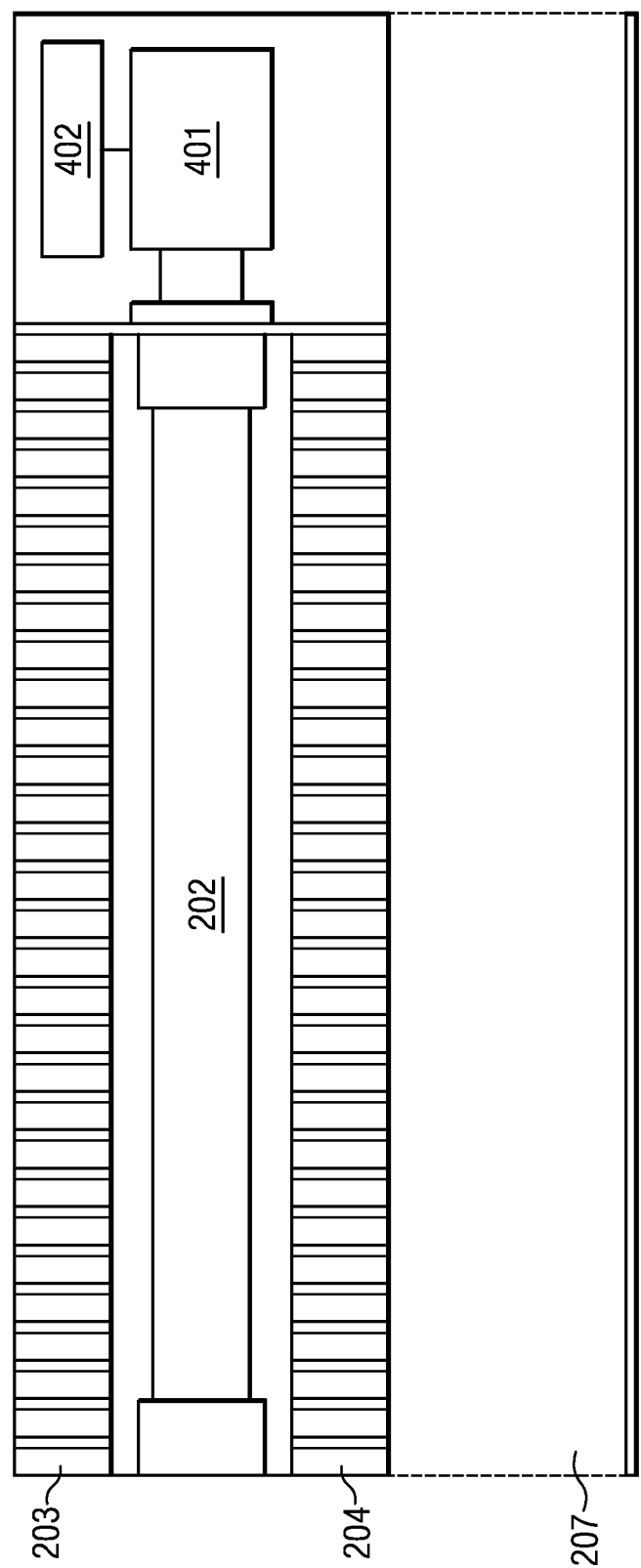

FIG. 4 is another cross section view of the photocatalytic device according to one embodiment.

Figure 5:
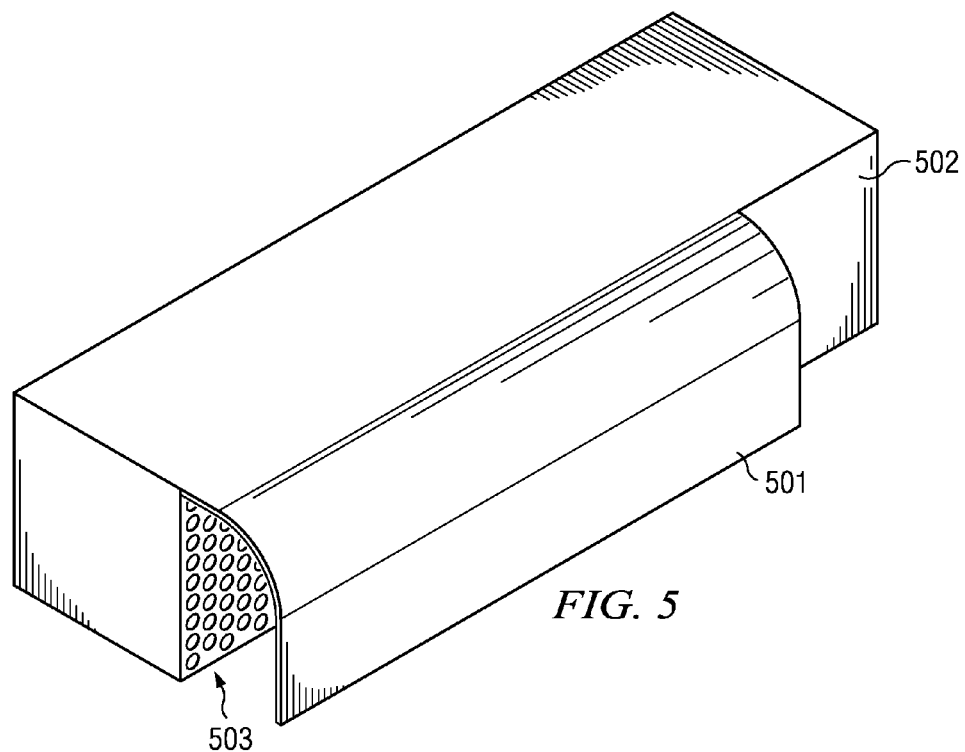

FIG. 5 illustrates an alternate embodiment of the photocatalytic device in which output shield expends partially across the front of the device.

Figure 6:
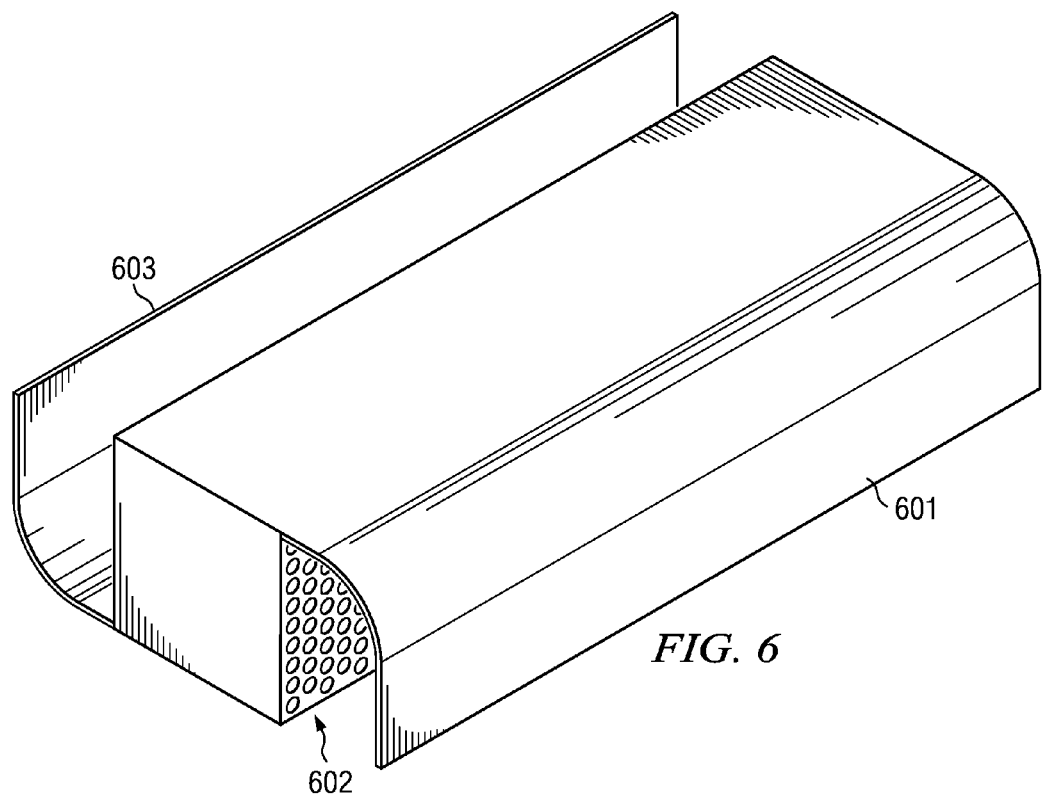

FIG. 6 illustrates a further alternative embodiment of the photocatalytic device.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a block diagram illustrating a mini-split heating and cooling system, which may offer an energy-efficient alternative to typical furnaces and air conditioners. Indoor unit 101 is mounted inside a building on wall 102. Outdoor unit 103 is mounted outside the building on wall 103. During the cooling season, heat exchanger 104 of indoor unit 101 extracts heat from inside the building and then sends it outside the building to outdoor unit 102. During the heating season, heat exchanger 105 extracts heat from the colder outside air and sends it into the building to indoor unit 101. Tubes 106 and 107 and compressor 108 are used to circulate refrigerant through the system.

Indoor unit 101 has an intake vent 109 that allows airflow to enter the unit and pass by or through heat exchanger 104. Exhaust vent 110 allows heated/cooled air to flow into the room for heating/cooling. In one embodiment, a photocatalytic device 111 is positioned near intake 109. Intake air flow passes through photocatalytic device 111, which may use ultraviolet light to significantly reduce the amount of microbials in the air space. This helps to reduce possible health problems associated with inhaling microbials. The ultraviolet light within photocatalytic device 111 is also beneficial in keeping the coils of heat exchange 104 free of mold, which increases system efficiency.

Ultraviolet (UV) light represents the frequency of light between 185 nanometers (nm) and 400 nm and is invisible to the naked eye. Within the UV spectrum lie three distinct bands of light: UV-A, UV-B, and UV-C. Longwave UV light (315 nm to 400 nm) or UV-A refers to what is commonly called "black light." UV-B (280 nm to 315 nm) or midrange UV is the type of light that causes sunburn. Germicidal UV light (185 nm to 280 nm) or UV-C is effective in microbial control. Research has demonstrated that UV light between 254 nm and 265 nm is most efficient for microbial destruction. Germicidal lamps that produce the majority of their output in this range are the most effective in microbial control and destruction.

FIG. 2 is a block diagram of a photocatalytic device 201 adapted for use with a mini-split system according to one embodiment. An ultraviolet light source 202 is positioned near photocatalytic structures 203 and 204. In one embodiment, the photocatalytic structures 203 and 204 are comprised of a plurality of fluted structures arranged in a honeycomb formation. Ultraviolet light from source 202 illuminates the photocatalytic structures 203 and 204. Curved reflective surfaces 205 and 206 are adapted to reflect ultraviolet light from source 202 so that the ends of photocatalytic structures 203 and 204 receive the ultraviolet light rays at an angle that is as perpendicular as possible.

The photocatalytic structures 203 and 204 may be, for example, a hydrated catalytic matrix, such as a hydrated quad-metallic catalyst. When the ultraviolet light 202 impacts the photocatalytic structures 203 and 204, ozone is produced in the catalytic matrix. The catalyst supports a hydroxyl radical reaction with water vapor that results in hydro peroxides, hydroxyl ions, super oxide ions, passive negative ions hydroxides, and ozonide ions. These are highly reactive chemical species. The hydroxyl radicals are very strong oxidizers and will attack organic materials. This creates oxidation that helps to reduce odors, volatile organic compounds (VOCs), airborne viruses, bacteria, mold and other types of air pollution. The quad-metallic catalytic matrix may be comprised of Rhodium, Titanium, Silver and Copper for example. In other embodiments, other combinations of rare and noble metals may be used in a multi-metallic catalytic matrix.

Ultraviolet light source 202 may be, for example, a high-intensity, broad-spectrum ultraviolet bulb or tube. In other embodiments, the ultraviolet source may be a low pressure fluorescent quartz bulb or a medium pressure amalgam lamp. Ultraviolet light falls in the band of light between 185 nm and 400 nm. There are three distinct bands of light within the ultraviolet spectrum: UV-A, UV-B, and UV-C. Longwave UV light (315 nm to 400 nm), or UV-A, refers to what is commonly called "black light." Midrange UV (280 nm to 315 nm), or UV-B, causes sunburn. Germicidal UV light (185 nm to 280 nm), or UV-C, is effective in microbial control. Research has demonstrated that the most efficient frequency for microbial destruction is between 254 nm and 265 nm within the UV-C band. Germicidal lamps that produce the majority of their output in this range will be the most effective in microbial control/destruction.

The curved reflectors 205 and 206 are positioned to reflect ultraviolet light from ultraviolet light source 202 to the internal face of photocatalytic structures 203 and 204. As a result, photocatalytic structures 203 and 204 receive both direct ultraviolet light from source 202 and reflected ultraviolet light from curved reflectors 205 and 206 as described in pending U.S. patent application Ser. No. 13/353,419, filed Jan. 19, 2012 and entitled "Photocatalytic Device with Curved Reflectors," the disclosure of which is hereby incorporated by reference herein in its entirety. In one embodiment, reflectors 205 and 206 are curved in a manner that optimizes the distribution of ultraviolet light across the faces of photocatalytic structures 203 and 204. In other embodiments, bent reflectors may be preferable to curved reflectors 205 and 206. The size, shape and angle of such bent reflectors would be selected to optimize the uniform distribution of ultraviolet light across the surfaces of target structures 203 and 204. It will be understood that other convex shapes may also be used for the reflectors in other embodiments.

In operation, air flows through photocatalytic structure 203, past ultraviolet light source 202, then through photocatalytic structure 204. As the air exits photocatalytic structure 204, it is directed downward by shield 207 into the intake vent (not shown) of a mini-split system.

FIG. 3 is a cross section view of photocatalytic device 201 along line A-A of FIG. 2. Arrow 301 illustrates how air flow moves through device 201. Air enters device 201 at face 302 of photocatalytic structure 203, passes thorough photocatalytic structures 203 and 204, and is deflected by shield 207 to exit at opening 303.

FIG. 4 is a cross section view of photocatalytic device 201 along line B-B of FIG. 2. Ballast 401 controls the amount of electricity provided to ultraviolet source 202 from power supply 402. Power supply 402 may be a battery, A/C transformer, or any other source of electric current.

FIG. 5 illustrates an alternate embodiment of the photocatalytic device in which output shield 501 expends partially across the front of the device. Air does not flow through area 502, which may contain a power supply and ballast as shown in FIG. 4. Shield 501 extends the length of photocatalytic structure 503 and is adapted to divert airflow out of the device and into a mini-split system or other input (not shown).

FIG. 6 illustrates a further alternative embodiment of the photocatalytic device. Output shield 601 extends the length of the device and is adapted to divert airflow out of photocatalytic structure 602 into a mini-split system or other input (not shown). Also, input shield 603 extends the length of the device and is adapted to channel airflow into and input photocatalytic structure of device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:
1. A photocatalytic device, comprising:
   a housing configured to be positioned at an intake of an indoor unit of a mini-split system, the indoor unit having an intake vent;
   a first catalyst substrate positioned at an intake area of the housing;
   a second catalyst substrate positioned at an exhaust area of the housing;
   the first and second catalyst substrates configured to support a hydroxyl radical reaction with ultraviolet light and water vapor that results in hydro peroxides and hydroxyl ions;
   an ultraviolet light source located within the housing and positioned between the first and second catalyst substrate;

a deflection shield portion of the housing, the deflection shield portion having a shape configured to divert airflow exiting the exhaust area of the housing into the intake vent of the indoor unit, the shape including a first portion parallel to the intake vent, a second portion perpendicular to the intake vent, and a curved portion coupling the first and second portions;

a plurality of convex reflectors located within the housing, positioned to face convex surfaces of the reflectors toward one another.

2. The photocatalytic device of claim 1, further comprising:

the convex reflectors positioned adjacent to the first and second catalyst substrates, each of the convex reflectors having a shape adapted to distribute reflected light from the ultraviolet light source across a near surface of a catalyst substrate.

3. The photocatalytic device of claim 2, wherein the shape of the convex reflectors is selected to minimize a distance between the ultraviolet light source and the near surface of a catalyst substrate.

4. The photocatalytic device of claim 1, wherein the catalyst substrates comprise a hydrated quad-metallic catalyst.

5. The photocatalytic device of claim 1, wherein the convex reflectors have a curved shape.

6. The photocatalytic device of claim 1, wherein the convex reflectors have a bent shape.

7. The photocatalytic device of claim 1, wherein the shape of the convex reflectors is selected to minimize a distance between the ultraviolet light source and a far surface of a catalyst substrate.

8. The photocatalytic device of claim 1, wherein the first and/or second catalyst substrates comprise a hydrated multi-metallic catalyst having elements selected from the group: Rhodium, Titanium, Silver and Copper.

9. The photocatalytic device of claim 1, wherein the first and/or second catalyst substrates are fluted.

10. A mini-split air conditioning system, comprising:

an intake vent; and a photocatalytic device positioned at an intake of the mini-split air conditioning system so that at least some air flows through the photocatalytic device before entering the intake vent, the photocatalytic device comprising:

a housing;

a first catalyst substrate positioned at an intake area of the housing;

a second catalyst substrate positioned at an exhaust area of the housing, the first and second catalyst substrates adapted to support a hydroxyl radical reaction with ultraviolet light and water vapor that results in hydro peroxides and hydroxyl ions;

an ultraviolet light source located within the housing and positioned between the first and second catalyst substrates;

a curved deflection shield portion of the housing, the curved deflection shield having a shape configured to divert airflow exiting the exhaust area of the housing into the intake vent;

a plurality of reflective surfaces within the housing, each reflective surface having a convex shape in at least one cross-sectional direction and positioned to face convex surfaces of the reflective surfaces toward one another.

11. The mini-split air conditioning system of claim 10, wherein:

the intake vent is part of an indoor unit of the mini-split air conditioning system.

12. The mini-split air conditioning system of claim 10, wherein:

the intake vent is part of a packaged terminal air conditioner (PTAC) system.

13. The mini-split air conditioning system of claim 10, wherein the catalyst substrate comprises a hydrated quad-metallic catalyst.

14. The mini-split air conditioning system of claim 10, the photocatalytic device further comprising:

the reflective surfaces adapted to be mounted in the photocatalytic device adjacent to the ultraviolet light source and at least one catalyst substrate, wherein the convex shape of the reflective surfaces are adapted to distribute reflected light from the ultraviolet light source across a surface of the at least one catalyst substrate.

15. The mini-split air conditioning system of claim 14, wherein the convex shape of the reflective surfaces are selected to minimize a distance between the ultraviolet light source and the surface of the catalyst substrate.

16. The mini-split air conditioning system of claim 10, wherein the reflective surfaces have a curved shape.

17. The mini-split air conditioning system of claim 10, wherein the reflective surfaces have a bent shape.

18. A method of manufacturing a photocatalytic device, comprising:

providing an ultraviolet light source within a housing;

providing a first catalyst substrate and a second catalyst substrate within the housing, wherein the catalyst substrates are adapted to support a hydroxyl radical reaction with ultraviolet light and water vapor that results in hydro peroxides and hydroxyl ions;

providing a first and second convex reflector within the housing;

positioning the convex reflectors adjacent to the first and second catalyst substrates and to face convex surfaces of the reflectors toward one another;

positioning the ultraviolet light between the convex reflectors and between the catalyst substrates, wherein the convex reflectors have a shape adapted to distribute reflected light from the ultraviolet light source across a surface of at least one of the catalyst substrates; and providing an air flow deflection shield portion of the housing, the air flow deflection shield having a curved shape configured to divert air passing through the housing toward an intake vent of an indoor unit of a mini-split air conditioning system.

19. The method of claim 18, wherein the catalyst substrates comprise a hydrated quad-metallic catalyst.

20. The method of claim 18, wherein the convex reflectors have a curved shape.

21. The method of claim 18, wherein the convex reflectors have a bent shape.

* * * * *